United States Patent

[11] 3,565,041

| [72] | Inventor | Aleck G. Brooks |
| | | P.O. Box 84, Ardsley, N.Y. 10502 |
| [21] | Appl. No. | 753,982 |
| [22] | Filed | Aug. 20, 1968 |
| [45] | Patented | Feb. 23, 1971 |

[54] METHOD OF CARRYING AND STORING LIVE FISH
4 Claims, 5 Drawing Figs.

| [52] | U.S. Cl. | 119/3 |
| [51] | Int. Cl. | A01k 63/00 |
| [50] | Field of Search | 119/3, 5 |

[56] References Cited

UNITED STATES PATENTS

| 2,949,882 | 8/1960 | Thomas, Jr. | 119/3 |
| 3,168,887 | 2/1965 | Bodell | 119/3 |
| 3,236,206 | 2/1966 | Willinger | 119/3 |
| 3,401,671 | 9/1968 | Axelrod et al. | 119/5 |

*Primary Examiner*—Hugh R. Chamblee
*Attorney*—James F. Woods

ABSTRACT: A method of carrying and storing live fish which comprises maintaining said live fish in water maintained in a bag containing air and having bag sidewalls and a bag bottom, said sidewalls and said bag bottom forming an angle at their junction greater than 90°.

PATENTED FEB 23 1971

3,565,041

INVENTOR
ALECK G. BROOKS

BY *James R. Woods*

ATTORNEY

3,565,041

METHOD OF CARRYING AND STORING LIVE FISH

BACKGROUND OF THE INVENTION

1. Field of the Invention

This invention relates to a method of storing and carrying live fish. More particularly, this invention relates to an improved method of storing and carrying live tropical fish which decreases the high fish mortality rate normally experienced.

2. Discussion of the Prior Art

Heretofore, aquarium fish especially goldfish and tropical fish have been stored and shipped live in plastic bags constructed of a breathable plastic material which allowed air to enter into the bag. The bag was not so porous, however, as to allow liquid to escape. These bags have had a generally square or rectangular bottom. The bottom formed a 90° angle with the bag sidewalls. It has been found that this bag configuration contributed to the unusually high fish mortality rate owing principally to the fact that fish in groups swimming into the corners would become confused when they wanted to swim out of the corner wherein they become wedged into the corners where available air is limited because of the crowded conditions. The fish for some unknown and unexplainable reason could not or did not in all instances back out of the corners due, in part, to the large numbers of fish in the small areas of the corners. Eventually, the fish died. Since there were at least two corners in every bag, many fish died between the time they were placed in the bag at their point or origin and were delivered to the fish vendor. It should be mentioned that the normal fish bag contains several hundred fish and the fish are carried in these bags over a period of several days. Since tropical fish are expensive and must generally be imported, this unsolved problem has cost the industry over the years large sums of money.

SUMMARY OF THE INVENTION

Objects of the Invention

It is an object of this invention, therefore, to provide a means for carrying and storing live fish.

It is another object of this invention, therefore, to provide a novel means for carrying and storing live tropical fish which substantially decreases the mortality rate involved in fish storage and transport.

These and other objects and advantages will become apparent from the following complete description, accompanying drawings and appended claims.

Statement of the Invention

Broadly, this invention contemplates a method of carrying and storing live fish which comprises maintaining said live fish in water maintained in a bag containing air and having bag sidewalls and a bag bottom, said sidewalls and said bag bottom forming an angle at their junction greater than 90°.

In a particularly desirable embodiment, this invention contemplates a method of carrying and storing live fish which comprises maintaining said live fish in water maintained in a plastic breathable bag said bag having bag sidewalls and a bag bottom forming an angle at their junction greater than 120°.

In a very preferable embodiment the bag is constructed of a breathable polyolefin, e.g., breathable polyethylene, is tubular and the bottom forms an angle with the tubular side of 180°. Depending upon the height of the tubular sidewalls, the bag will have a generally balloon shape, at least at its lower extremity.

BRIEF DESCRIPTION OF DRAWINGS

A suitable bag for use in the method of the present invention is shown in the accompanying drawings in which.

DESCRIPTION OF PREFERRED EMBODIMENT

A preferred embodiment of the present invention resides in maintaining live tropical fish in a plastic breathable bag whose bottom wall forms a junction with the sidewalls of at least 120°. As indicated above, preferably the bag is completely arcuate at the bottom and is joined to a tubular sidewall portion of the bag. This tubular-sidewall portion comprises the bag sidewalls. Thus, the bag is entirely devoid of any corners beneath the surface of the water.

Figure 1:
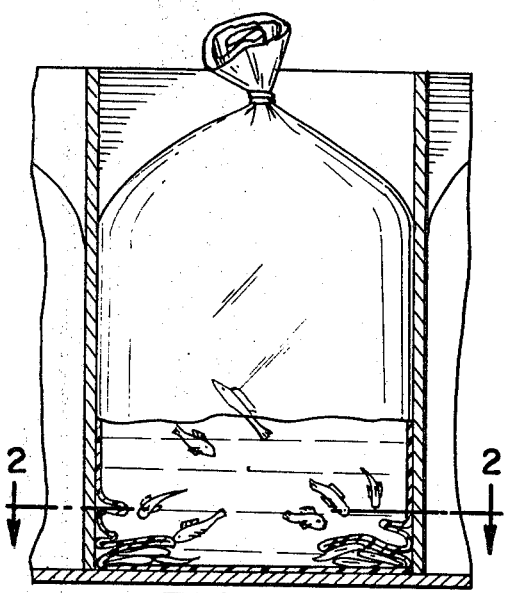
FIG. 1 is a side elevation of a prior-art bag containing fish in groups clustered at the corners.
Figure 2:
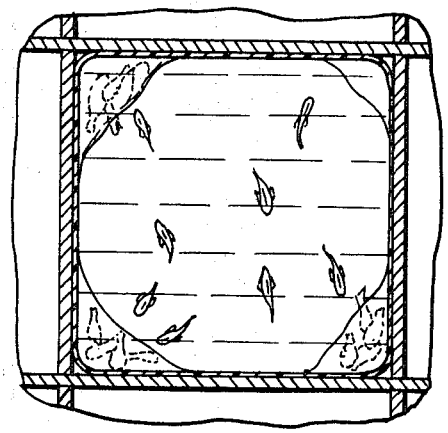
FIG. 2 is a sectional view taken along line 2—2 of FIG. 1.
Figure 3:
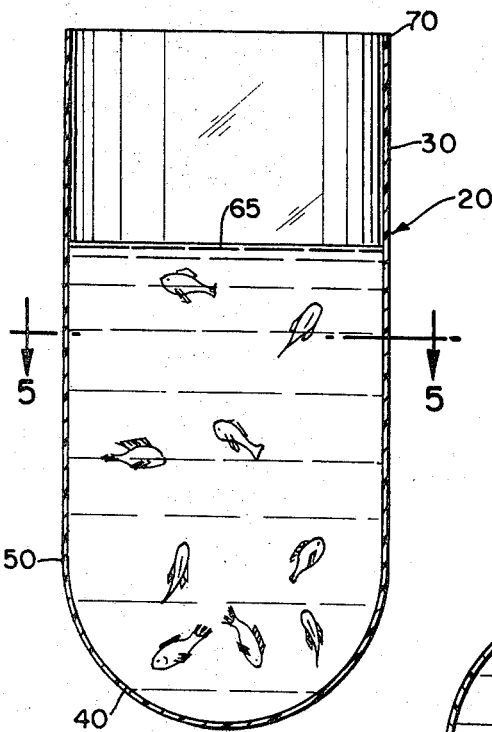
FIG. 3 is a side elevation of a bag useful in the process of this invention.
Figure 4:
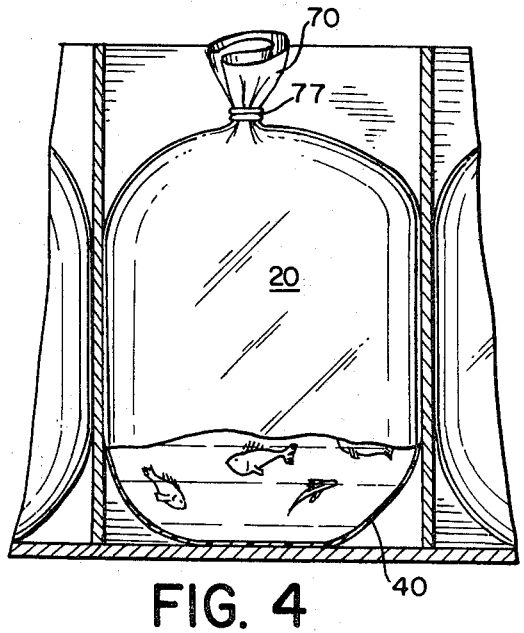
FIG. 4 is a side view of the bag maintained in a shipping container with the top portion closed.
Figure 5:
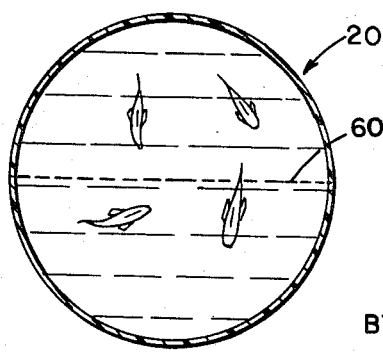
FIG. 5 is a sectional view taken along line 5—5 of FIG. 3, the section being taken above the junction of the bag sidewalls and the bag bottom.

Such a bag is shown in the accompanying drawings FIGS. 3—5 in which the bag is generally represented by reference numeral 20 and comprises a tubular-sidewall portion 30 which is formed integrally with an arcuate bottom portion or bag bottom 40 at a junction 50. The bag is presealed before water is introduced therein. The seal is suitably made across the arcuate bottom portion running from a junction point on one side of the bag down the bag bottom arc and up to the junction point on the opposite side of the bag. This junction is represented by reference numeral 60. It is suitably sealed by means of heat fusion which bonds pieces of plastic together. It will be realized that while a bag which does not have such a seal is contemplated by the present method, such a bag may be expensive to construct. The bag illustrated can be readily made by easily achieved alterations of presently available plastic bag making equipment.

After the bag is sealed, the water is introduced into it up to a level 65. The top of the bag 70 can be left open but is usually sealed by suitable sealing means after the live fish are introduced into the storage and shipping container. Such suitable sealing means include heat sealing means. Preferably, however, the bag walls are drawn together and closed firmly together using a heavy duty rubber band 77 wrapped doubly to form an air bubble.

It will be realized that while this preferred bag for use in the method of this invention shows the bag in a simple form that similar bags utilizing more bag panels are similarly effective for carrying and storing fish. Thus, while the bag bottom is shown constructed from two bag panels sealed together, it is also contemplated to construct the bag bottom from more panels such as four more panels. It is preferred when multiple panels are employed that the angle between panels be greater than 90°.

Additionally, instead of utilizing a completely arcuate bottom, it is contemplated to use a bag constructed of a plurality of a generally triangular-shaped panel with the apex of the triangle at the bottom of the bag and the base of the triangle in junction with the bag sidewalls. Of course, the junction is greater than 90°. In this instance, it is preferred that the angle formed between panels be greater than 90°.

From the above description including the drawings, it is apparent that use of bags as above defined for carrying and storing live fish eliminates the cause, heretofore largely unrecognized, for the high fish mortality rate when being carried or stored in plastic bags. It will also be apparent that it is virtually impossible for fish to maneuver into a position in the bag where they are trapped by bag sidewalls. This is particularly useful for the larger and less agile fish, notably the angel fish.

By carrying and storing tropical and other fish in accordance with the method of this invention, the fish mortality rate is substantially decreased and the financial loss substantially diminished. This is done without any additional cost or by use of an additional agent such as a fish medicament. Other advantages of the present method will become apparent to one skilled in the art from the preceding disclosure and from the following claims.

The terms and expressions used herein have been used on terms of description and not of limitation as there is no intention, in the use of such terms and expressions, of excluding any equivalents, or portions thereof, as many modifications and departures are possible within the scope of the invention claimed.

I claim:

1. A method of carrying and storing live fish which comprises maintaining said live fish in water maintained in a breathable plastic polyolefin bag containing air and having sidewalls and a bag bottom, said sidewalls and said bag bottom forming an angle at their junction greater than 90°, said breathable plastic polyolefin bag characterized by an arrangement of seams joining the bag bottom with the bag sidewalls such that when said bag contains water, at least the lower extremity of said bag assumes a generally balloon shape, said bag capable of being deformed so as to preclude the contained fish from becoming caught within corners of the bag or folds of the bag body.

2. A method according to claim 1 wherein said sidewalls and said bag bottom form an angle at their junction greater than 12°.

3. A method according to claim 1 wherein said polyolefin is polyethylene and said bag has tubular sidewalls.

4. A method according to claim 1 wherein said bag is constructed of a plurality of generally triangular-shaped panels with the apex of the triangle at the bottom of the bag and the base of each triangle in junction with the bag sidewalls.